(12) United States Patent
Helmick et al.

(10) Patent No.: US 10,896,089 B2
(45) Date of Patent: Jan. 19, 2021

(54) SYSTEM LEVEL DATA-LOSS PROTECTION USING STORAGE DEVICE LOCAL BUFFERS

(71) Applicant: Western Digital Technologies, Inc., San Jose, CA (US)

(72) Inventors: Daniel Lee Helmick, Broomfield, CO (US); Paul David Martin, San Clemente, CA (US)

(73) Assignee: Western Digital Technologies, Inc., San Jose, CA (US)

(*) Notice: Subject to any disclaimer, the term of this patent is extended or adjusted under 35 U.S.C. 154(b) by 0 days.

(21) Appl. No.: 16/377,023

(22) Filed: Apr. 5, 2019

(65) Prior Publication Data

US 2019/0310913 A1  Oct. 10, 2019

Related U.S. Application Data

(60) Provisional application No. 62/654,300, filed on Apr. 6, 2018.

(51) Int. Cl.
| *G06F 11/10* | (2006.01) |
| *G06F 3/06* | (2006.01) |
| *G06F 13/16* | (2006.01) |
| *G06F 12/0804* | (2016.01) |

(52) U.S. Cl.
CPC ........ *G06F 11/1076* (2013.01); *G06F 3/0619* (2013.01); *G06F 3/0656* (2013.01); *G06F 3/0659* (2013.01); *G06F 3/0689* (2013.01); *G06F 12/0804* (2013.01); *G06F 13/1668* (2013.01); *G06F 2212/608* (2013.01)

(58) Field of Classification Search
CPC .. G06F 11/1076; G06F 3/0619; G06F 3/0656; G06F 3/0659; G06F 3/0689; G06F 12/0804; G06F 13/1668; G06F 2212/608
See application file for complete search history.

(56) References Cited

U.S. PATENT DOCUMENTS

| 9,767,920 | B2* | 9/2017 | Kim ....................... G11C 29/42 |
| 10,379,948 | B2* | 8/2019 | O'Krafka ............... G11C 29/52 |
| 10,409,511 | B1* | 9/2019 | Subbarao .............. G06F 3/0614 |
| 2008/0056025 | A1* | 3/2008 | Kanagawa .......... G06F 11/1044 365/189.15 |
| 2009/0210777 | A1* | 8/2009 | Weiberle ............. G06F 11/1641 714/819 |
| 2018/0039538 | A1* | 2/2018 | Freikorn ............. G06F 11/1048 |
| 2019/0385689 | A1* | 12/2019 | Jang ...................... G11C 29/52 |
| 2019/0392299 | A1* | 12/2019 | Ma ........................ G06F 7/5443 |

* cited by examiner

*Primary Examiner* — Phung M Chung
(74) *Attorney, Agent, or Firm* — Chang & Hale LLP

(57) ABSTRACT

A computing system comprises a host system, a first storage device, a second storage device, a third storage device, a fabric interconnect device and a controller separate from the host system. The first, second, and third storage devices comprise a first, second, and third local memory buffer. The fabric interconnect device is configured to connect the first, second, and third storage devices over a fabric network to the host system. In response to receiving a write operation from the host system, a controller (e.g., on the first storage device or the fabric interconnect device) is configured to calculate error-correction data (e.g., parity data) by using data-protection operations (e.g., XOR operation(s)) directly on data stored on the first, second, and third local memory buffer, without having to rely on computing resources of the host system.

20 Claims, 6 Drawing Sheets

OFF-LOADED WRITE PROCESS
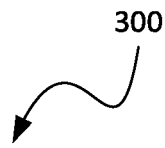
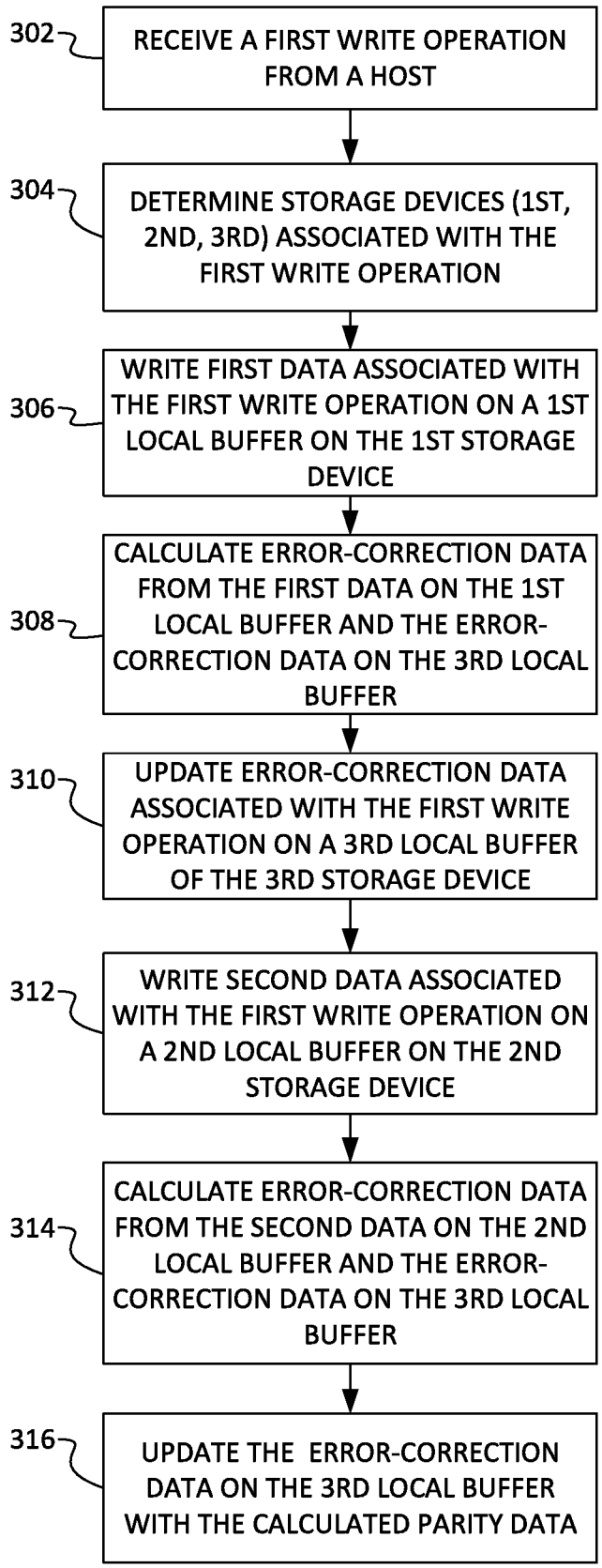

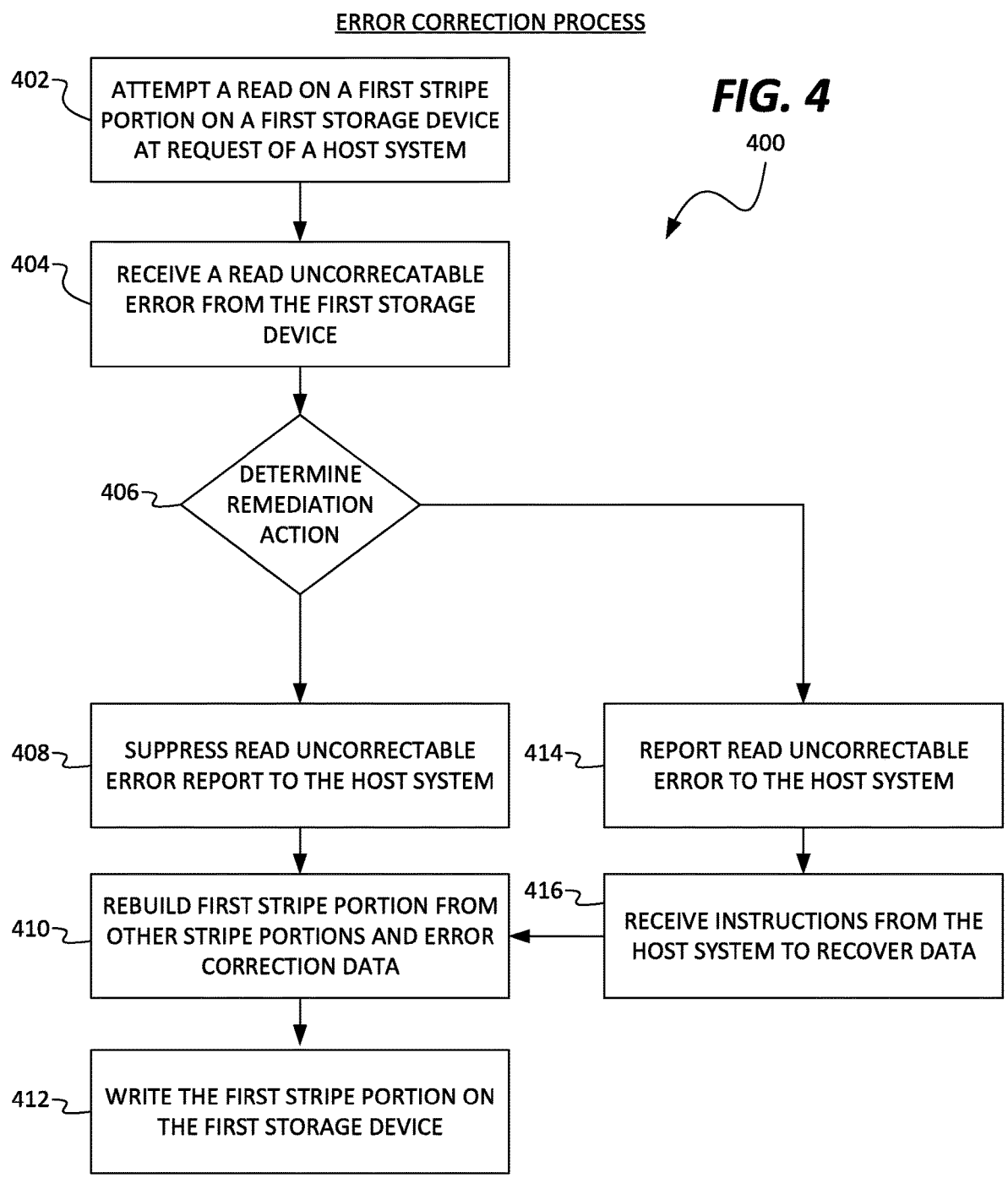

SYSTEM LEVEL DATA-LOSS PROTECTION USING STORAGE DEVICE LOCAL BUFFERS

CROSS-REFERENCE TO RELATED APPLICATIONS

The present application claims priority to U.S. Provisional Patent Application Ser. No. 62/654,300, filed Apr. 6, 2018, entitled "COMPUTING SYSTEM INTERCONNECT ARCHITECTURE," the disclosure of which is hereby incorporated by reference in its entirety.

BACKGROUND

Field

This disclosure relates to storage devices. More particularly, the disclosure relates to systems and methods for implementing scalable caching using local buffers on storage devices.

Description of Related Art

In certain computing systems, data storage devices can be connected to several components such as host systems or other data storage devices. Various connecting technologies exist for facilitating these interconnections.

SUMMARY

Fabric interconnect systems connect multiple components together by providing a fabric over which these components communicate. In many embodiments, the fabric interconnect systems provide peer-to-peer communications, allowing components to communicate, in a decentralized way, with other components. For example, storage devices could communicate directly with other storage devices without necessarily going through a host processor. In addition, interconnect systems can provide computational capabilities that allow host systems to off-load at least some functions into one or more controllers of one or more components operating on the fabric interconnect system.

As more computational processes are off-loaded onto a fabric interconnect system, additional computing resources are needed in the fabric interconnect system in terms of processing and/or caching in order to maintain the performance of the fabric interconnect system. Generally, these computational resources are added to a fabric interconnect device (e.g., a switch or gateway) on the fabric interconnect system that handles routing on the fabric. However, as the scale of computation handled by the fabric interconnect device increases, the cost of adding additional computing resources can be prohibitive.

One possible solution is to repurpose existing local buffers or caches on components that are added onto the fabric to be used in fabric interconnect system computations. For example, storage devices typically include some sort of buffer. These buffers on the storage devices can be repurposed to be utilized in fabric interconnect system computations. Generally, the greater the number of components added to the fabric, the greater the demands on the fabric interconnect device. However, as the amount of local buffers scale up with the number of storage devices being added to the fabric, the computing resources available to the fabric interconnect device also scale up.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

FIG. 3 is a flow diagram illustrating a write process off-loaded by the host system to other components of the fabric interconnect system, in accordance with some embodiments.

FIG. 4 is a flow diagram illustrating an error correction process during a RAID read operation of the fabric interconnect system, in accordance with some embodiments.

DETAILED DESCRIPTION

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

The headings provided herein are for convenience only and do not necessarily affect the scope or meaning of the claimed invention. Disclosed herein are example implementations, configurations, and/or embodiments relating to data storage devices with secure access.

Although the principles disclosed herein may be applicable to any suitable or practical data storage system or environment, for convenience, certain embodiments are disclosed herein in the context of scalable caching in interconnect systems.

Fabric Interconnect System

In a centralized communications design, data communications and processing go through the CPU and CPU components such as the dynamic random access memory (DRAM), rack interconnection, Peripheral Component Interconnect Express (PCIe) lanes, processor cores, and internal busses. This means the CPU is the bottleneck for data transfers to other components, and there are multiple data transfers in and out of the CPU that might compound the effects. For example, processing is delayed while the CPU waits for confirmations of completed work. However, this bottleneck can be alleviated by using a fabric interconnect system to bypass the CPU and its components in at least some communications and processing.

Various interconnect solutions can provide improved throughput with communications between components on the fabric. In some embodiments, using dual ported NVMe drives allows multiple master devices to communicate data with the storage devices through the different ports of the NVMe drives. In some embodiments, GPU/CPU interconnect solutions such as CCIX, NVIDIA's NVLink, Gen-Z, RapidIO, NVMe over Fabrics (NVMeoF), Open Coherent Accelerator Processor Interface (OpenCAPI), OmniXtend, Compute Express Link (CXL), and/or proprietary interconnect technologies can be used.

Figure 1:
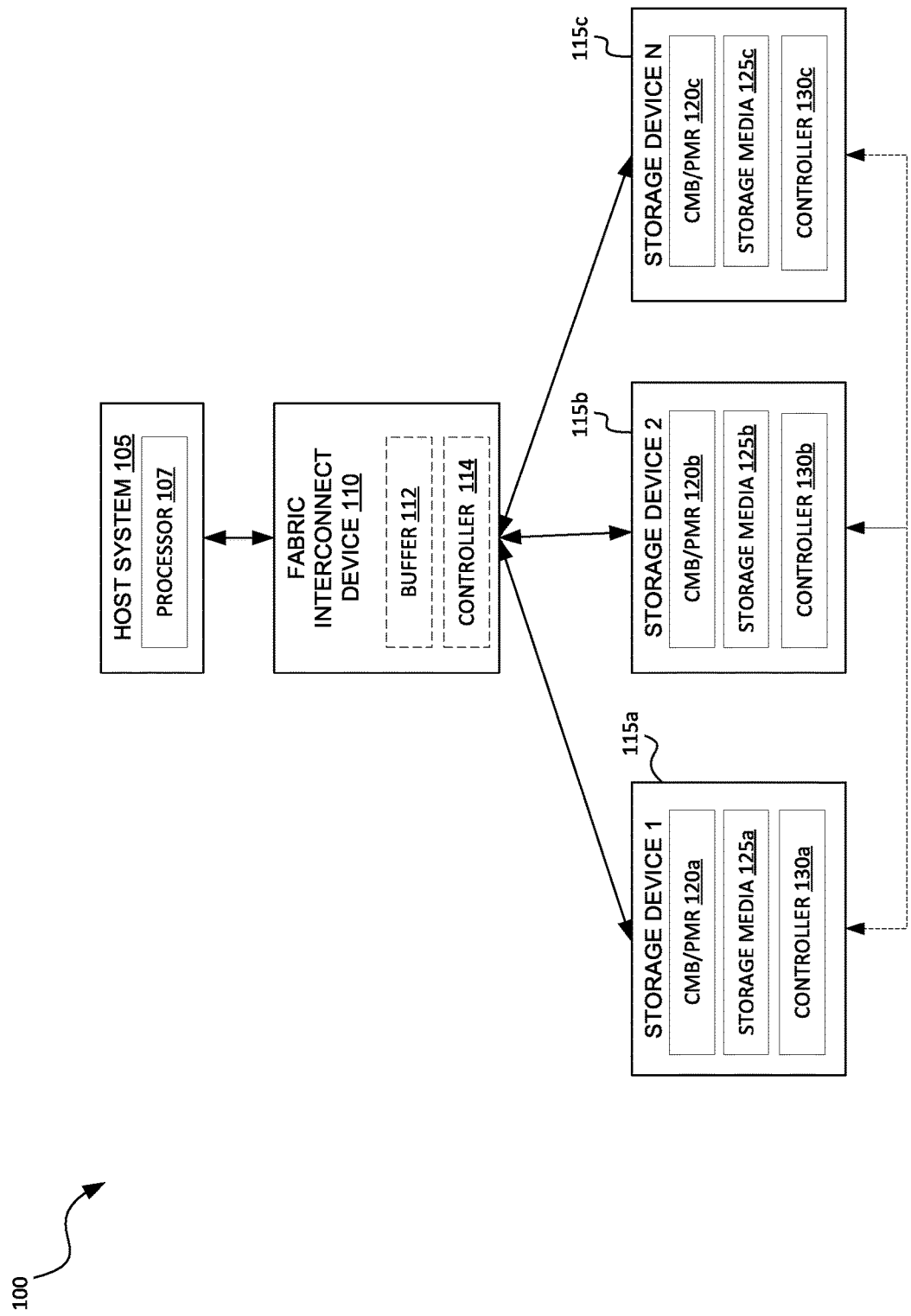
FIG. 1 is block diagram illustrating an implementation of a fabric interconnect system, in accordance with some embodiments.

FIG. 1 is block diagram illustrating an implementation of a fabric interconnect system 100, in accordance with some embodiments. While some example features are illustrated, various other features have not been illustrated for the sake of brevity and so as not to obscure more pertinent aspects of the example implementations disclosed herein. To that end, as a non-limiting example, fabric interconnect system 100 includes a host system 105 and a fabric interconnect device 110 forming a fabric for one or more various components, such as storage devices 1, 2 . . . N (115a, 115b, 115c—collectively 115). While FIG. 1 shows three storage devices and one fabric interconnect device, there may be any number of storage devices and fabric interconnection devices in the fabric interconnect system.

The host system 105 may be a computing device, such as a personal computer, a workstation, a computer server, or a data center processing tier of servers that includes one or more storage devices and/or is connected (e.g., via a network, cable, fabric etc.) to one or more separate storage devices 115. The host system 105 may include one or more processors 107, one or more types of host memory, and a display and/or other user interface components such as a keyboard, a touch screen display, a mouse, a track-pad, a digital camera and/or any number of supplemental devices to add functionality.

The fabric interconnect device 110 may be a switch for a particular protocol, such as NVMe or NVMeoF. In one embodiment, the fabric interconnect device is an NVMeoF switch providing an NVMeoF interface to NVMe storage devices. The fabric interconnect device may be configured to provide protocol translation from NVMeoF to NVMe and vice versa. This translation may be transparent to the host system 105 and the storage devices 115.

In some embodiments, the fabric interconnect device comprises a controller 114 and memory for serving as a buffer 112. The fabric interconnect device further comprises multiple connections (e.g., ports, interfaces, etc.) for forming the fabric. The fabric may be formed using any of various technologies, such as fiber channel, Ethernet (TCP/IP), RDMA over Converged Ethernet (RoCE), iWARP, InfiniBand or the like.

The storage devices 115 may comprise hard disk drives (HDDs), solid-state drives (SSDs), solid-state hybrid drives (SSHDs), combinations thereof, or the like. In some embodiments, the storage devices comprise a memory buffer like Controller Memory Buffer (CMB) and/or Persistent Memory Region (PMR) 120a, 120b, 120c (collectively memory buffer 120), storage media 125a, 125b, 125c (e.g., rotating disc, solid state memory, etc.), and one or more controllers 130a, 130b, 130c.

In some embodiments, the local memory buffer 120a is separate from main storage memory (e.g., storage media 125a, 125b, 125c) of the storage device 115. Typically, the local memory buffer comprises a small amount of expensive, high-speed memory, while main storage memory comprises a large amount of cheaper, lower speed storage memory. In some embodiments, the storage device memory buffer 120 is either CMB or PMR. In other embodiments, a storage device may have both CMB and PMR. In certain embodiments the storage device memory buffer 120 may use a different technology.

In some embodiments, the storage devices 115 incorporate NVMe technology. NVMe drives utilize a PCIe Base Address Register (BAR) that is used for certain NVMe specific data types. An NVMe CMB is a PCIe BAR (or part thereof) that can be used to enable memory like accesses of loads and stores to an NVMe block storage device. As well as a BAR, two optional NVMe registers are used in implementing CMB: CMBLOC for location and CMBSZ for size and supported types. CMB provides an alternative to placing queues in host memory or placing data for Direct Memory Access (DMA) in host memory. Meanwhile, one or more PMRs are also located onto the PCIe BAR space of an NVMe block storage device, and the PMR may be interacted with similarly as the CMB, and the PMR provides persistence of the data within the PMR on loss of power.

While CMB and PMR were developed for use with the certain NVMe specific data types, these buffers can be used in the fabric interconnect system 100 for other functions. The memory buffer 120 can be used during certain computations off-loaded to other components of the fabric interconnect system by the host system 105. For example, RAID operations may be performed using the memory buffer 120 without necessarily involving the host system 105.

In some embodiments, the components of the fabric interconnect system 100 such as the fabric interconnect device 110 and/or the storage devices 115 include additional circuitry, modules or data structures not shown in FIG. 1. For example, the fabric interconnect device can include random access memory (RAM), persistent storage and/or data interfaces. The storage devices 115 can include additional types of buffers, volatile and non-volatile memory, and/or data interfaces. In some embodiments, two or more of the components may be combined. For example, a system on a chip (SoC) could include both a storage device controller 130a and a CMB/PMR 120a or other type of local buffer.

Figure 2A:
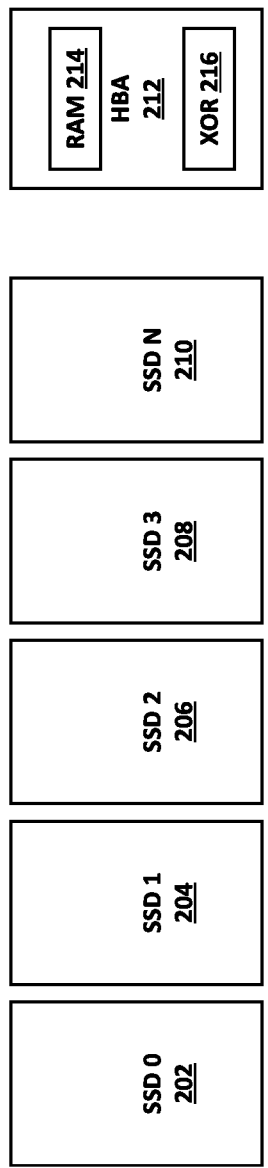
FIG. 2A is block diagram illustrating a conventional Non-Volatile Memory Express (NVMe) Redundant Array of Independent Disk (RAID) deployment, with RAID operations handled by the host bus adapter.

FIG. 2A is block diagram illustrating an implementation of a conventional NVMe RAID deployment, with RAID operations handled by the host bus adapter (HBA) 212. RAID is a data storage virtualization technology that combines multiple physical disk drive components into one or more logical units for the purposes of data redundancy, performance improvement, or both. As shown in FIG. 2A, data storage devices such as SSDs 0, 1, 2, 3, N (202, 204, 206, 208, 210) form the RAID array. During a write operation, the HBA causes data to be written into the SSDs, with parity data being written to one of the devices. While the example implementations are described with respect to SSDs, other data storage devices comprising, for example, storage class memory, rotating magnetic media, can be used as well.

Data is distributed across the storage devices in the RAID array in one of several ways, called RAID levels, depending on the required level of redundancy and performance. For example, RAID 0 consists of striping, but no mirroring or parity. RAID 1 consists of data mirroring, without parity or striping. RAID 5 consists of block-level striping with distributed parity. RAID 6 consists of block-level striping with double distributed parity. RAID 1+0: (RAID 10) creates a striped set from a series of mirrored drives. Other RAID variations could also be utilized.

Parity is a calculated value used to reconstruct data after a failure. While data is being written to a RAID volume, parity is calculated by doing an exclusive OR (XOR) procedure on the data. The resulting parity is then written to the volume. The data and calculated parity are contained in a plex that is "striped" across multiple disks. If a portion of a RAID-5 volume fails, the data that was on that portion of the failed volume can be recreated from the remaining data and parity information.

The HBA 212 uses an XOR engine 216 (e.g., hardware and/or software for performing XOR operations) and RAM 214 local to the HBA to perform the parity calculation. As the number of SSDs grow, the amount of RAM 214 and complexity of calculations grow. For example, if there are ten SSDs, then nine stripes of data are retained in RAM 214 and nine XOR calculations are performed to calculate the parity data. With large enough numbers of SSD devices, the amount of RAM 214 needed may become cost prohibitive.

Figure 2B:
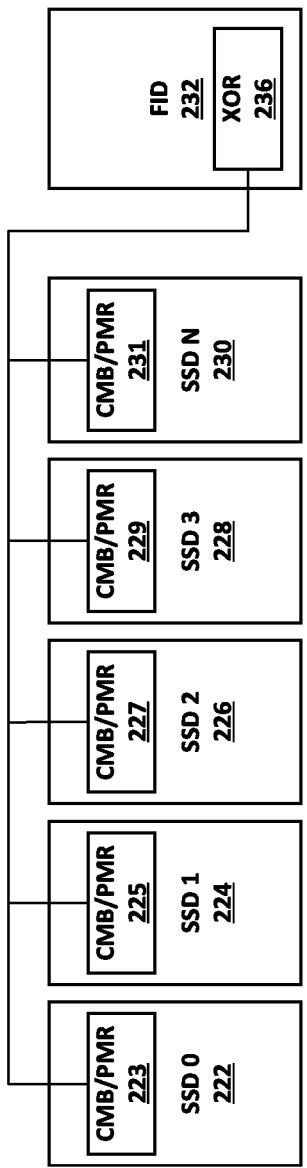
FIG. 2B is block diagram illustrating an NVMe RAID deployment on the fabric interconnect system, in accordance with some embodiments.

FIG. 2B is block diagram illustrating an implementation of an NVMe RAID deployment on a fabric interconnect system 100 such as that of FIG. 1, with RAID operations handled by a fabric interconnect device 232, in accordance with some embodiments. A RAID array comprising a set of storage devices such as SSD's 0, 1, 2, 3, N (222, 224, 226, 228, 230) are connected to a fabric by the fabric interconnect device 232. SSD 0-N each has a local buffer or cache, such as CMBs/PMRs (223, 225, 227, 229, 231). While FIG. 2B illustrates an embodiment of a RAID implementation, other types of technologies, in particular data loss protection technologies, can be implemented using the fabric interconnect system 100.

In a write operation, the fabric interconnect device 232 writes the data into the RAID array by writing portions of the data and the calculated parity data into the respective local buffers (223, 225, 227, 229, 231) of the SSDs. The data in the buffers can be used for at least two purposes. First, the buffered data can be used by the SSD to write the data into permanent storage (e.g., non-volatile memory). Second, the buffered data can be used by the fabric interconnect device 232 in performing XOR 236 calculations using the XOR engine 236.

As the data is buffered in local buffers of the SSDs, the fabric interconnect device 232 does not need to store the data in its own memory. Thus, the fabric interconnect device can have less RAM than the HBA 212 of FIG. 2A, while still supporting the same size of RAID array. In some embodiments, the fabric interconnect device can use the XOR engine 236 to perform XOR calculations directly on the data stored in the SSD's local buffers. For example, assuming the parity data is stored on SSD N's local buffer (CMB/PMR 231), when data is written to SSD 0's local buffer (CMB/PMR 223), that data can be XOR'ed with data stored in CMB/PMR 231 to calculate the new parity data. The data stored in CMB/PMR 231 can then be updated with the calculated parity data.

As discussed above, the XOR calculations (or other data protection operations), in some embodiments, are performed in-place in the local buffer memory of the SSDs. This provides better scalability to the fabric interconnect system. As additional SSDs are added to the fabric, the amount of available local buffers increases. These newly added local buffers can provide sufficient new buffer space to support operations of the now larger RAID array. Thus, this design can remove buffer space as a limitation in possible RAID array size.

In other embodiments, the data protection operations may include moving stored data on NAND to a different physical location as it is updated. In one implementation, a copy is in-place from a SSD logical block address (LBA) level (e.g., the LBA stays the same), but the data is being read, updated, and written back elsewhere physically on a storage medium.

In another implementation, the system level LBA outside of the SSD could perform a read of LBA_old (which may be storing error-correction data), receive an update of data values (e.g., new error-correction data), and then write LBA_new with the updated values. Vendor specific commands or NVMe interface commands can be used to initiate the update.

In other embodiments, the data protection operations may include moving from one NVMe Namespace (NS) or Endurance Group (EG), which are different sub sections of LBAs of the same NVMe drive, to another NS or EG on the same drive. NS and EG are described in more detail by the NVMe specifications.

While the above has provided an example using SSDs and CMB/PMR, these examples are non-limiting. It will be apparent that other types of storage devices could be used (e.g., HDDs, SSHDs, etc.), as well as other types of local buffers (e.g., RAM, CPU/GPU caches, register space, etc.). In addition, other variations can be implemented, such as designating one of the SSDs as a master device that takes on the role of the fabric interconnect device in coordinating the write operation and initiating the XOR calculation.

In some embodiments, off-loading of host processor functions can be extended to other data-loss prevention technologies. The systems and methods described herein are not limited to parity data but can be applied more to error-correction data in general, such Cyclical Redundancy Code (CRC), Error Detection Code (EDC), erasure coding, fountain code, raptor code, tornado code, Low Density Parity Check (LDPC) code, Bose Chauduri Hocquenghem (BCH) code, and/or the like. In addition, the described systems and methods are not limited to XOR operations but can also be applied to data-protection operations in general, such as linear matrix multiply operations (e.g., when using system level error code correction), additions, positioning shifts in conjunction with the XOR operations, and/or the like.

FIG. 3 is a flow diagram illustrating a write process 300 off-loaded by the host system 105 to other components of the fabric interconnect system 100, in accordance with some embodiments. The write process 300 may be performed, for example, by one or more controllers of the fabric interconnect system, such as one of the storage device controllers 130*a*, 130*b*, 130*c* and/or the fabric interconnect device controller 110.

For ease of explanation, the following scenario refers to the components of FIG. 1. However, the process 300 can be implemented by other embodiments of the fabric interconnect system.

In one embodiment, the write operation is a RAID write operation involving writing parity data to a parity drive and using data-protection operations, such as XOR calculations, to generate the parity data. This scenario will assume a distributed parity RAID level, such as RAID 5, using a first, second and third storage device (e.g. storage devices 115*a*, 115*b*, 115*c* of FIG. 1) as the storage devices in the RAID array to which the RAID write operation is directed. The third storage device 115*c* functions as the parity drive for the RAID array. Other RAID implementations can use multiple parity drives or rotate the designated parity drive. The total number of storage devices in the RAID array could be three, four, five or even more. In addition, there could be multiple RAID arrays and/or fabric interconnect devices 110 in the system.

As will be apparent, embodiments of the fabric interconnect system 100 can also operate in other data-protection implementations. For example, the system 100 may be applied in scenarios involving generating error-correction data such as CRC, EDC, erasure coding, raptor code, tornado code, and/or the like. The system 100 may also be applied to scenarios involving data-protection operations such as linear matrix multiply operations, positioning shift operations in conjunction with the XOR operations, and/or the like.

At block 302, a controller of the fabric interconnect system 100 receives a first write operation from the host system 105. The controller is separate from the host system 105 (e.g., on a storage device 115a or fabric interconnect device 110), which is offloading at least some processing to the separate controller. The first write operation directs the storage array to store a set of data. In one scenario, the first write operation is a RAID write operation.

At block 304, the controller determines which storage devices are associated with the first write operation. For example, the host system 105 may be in communication with multiple storage arrays and the controller determines which storage array the first write operation should be performed on. The controller can then identify the storage devices belonging to the determined storage array.

In one scenario, the first, second and third storage devices (115a, 115b, 115c) are the storage devices of a target RAID array for the RAID write operation. The controller can determine that the data set should be written as a stripe on the first storage device 115a and the second storage device 115b, with parity data written on the third storage device 115c.

At block 306, the controller writes first data associated with the first write operation to a first local buffer 120a on the first storage device 115a. For example, controller may divide the stripe into a first stripe portion and a second stripe portion for writing on the first storage device 115a and the second storage device 115b. In one embodiment, the first data is the first stripe portion.

At block 308, the controller calculates error-correction data from the first data on the first local buffer 120a and the error-correction data on the third local buffer 120c.

In one scenario, the error-correction data comprises parity data (may also be called intermediate parity data if other operations will cause additional updates) that is calculated using a data-protection operation (e.g., an XOR, erasure protection, and/or mirroring operation). If no previous parity data has been written yet on the third local cache, the first data may be written directly on the third local cache (e.g., as mirrored data or an initial parity data without needing an XOR operation).

In one embodiment, the data-correction operation is performed in-place in the local buffer 120a, 120c. The controller may not need to copy the data in the local buffers to another buffer to perform the data-correction operation but may perform the data-correction operation directly on the local buffers.

At block 310, error-correction data associated with the first write operation is written on the third local buffer 120c of the third storage device 115c. The third local buffer 120c may have contained previous error-correction data that is being overwritten by the error-correction data calculated at block 308 or may have no previous error-correction data.

At block 312, the controller writes second data associated with the first write operation on a second local buffer 120b of the second storage device 115b. In one embodiment, the second data is the second stripe portion.

At block 314, the controller calculates the error-correction data from the second data on the second local buffer 120b and the error-correction data on the third local cache 120c.

In some embodiments, error-correction data is calculated using a data-protection operation (e.g., an XOR operation).

At block 316, the controller updates the error-correction data associated with the first write operation on the third local buffer 120c of the third storage device 115c. The third local buffer 120c may have contained previous error-correction data that is being overwritten by the error-correction data calculated at block 314. In some embodiments, the controller may further cause the error-correction data on third local buffer 120c to be flushed into the persistent storage of the third storage device, for example, after writes to the other storage devices are completed.

In some embodiments, some of these above steps are performed in parallel. For example, blocks 306-316 may be done in parallel with writes to the storage devices occurring simultaneously. In some embodiments, the storage devices can include a queue for simultaneously received commands. For example, if two error-correction calculations are initiated in parallel, the queue can ensure that data remains consistent by controlling when reads or writes to the error-correction data occur.

In some embodiments, the order of some of these steps may occur differently. For example, the write operation on the second storage device 115b (block 312) may occur before the write operation on the first storage device 115a (block 306). In another example, error-correction data may first be written on the third storage device 115c as a result of data being written to the second storage device 115b (block 316), with the error-correction data subsequently being updated as a result of data being written to the first storage device (block 310).

As will be apparent, additional storage devices can be used. For example, the data set being written can be divided into three, four, five or more stripe portions and written across a corresponding number of storage devices. Writing data to the fourth, fifth, etc. storage device can cause further updates to the parity data stored on the parity drive (e.g., third storage device 115c). Furthermore, depending on the RAID level used, the parity drive for subsequent RAID writes can rotate among the available storage devices.

FIG. 4 is a flow diagram illustrating an error correction process during a first read operation of the fabric interconnect system, in accordance with some embodiments. The error correction process 400 may be performed, for example, by one or more controllers of the fabric interconnect system, such as one of the storage device controllers 130a, 130b, 130c and/or the fabric interconnect device controller 110.

At block 402, a first read is attempted on a first stripe portion on a first storage device. In some instances, the stored data becomes corrupted and unreadable. For example, physical media on which the first stripe portion is stored may have become damaged or the first stripe portion has otherwise degraded in some way. The first read then fails.

At block 404, the controller receives an uncorrectable read error (URE) from the first storage device. A URE indicates that a read operation on a sector of the storage device has failed and the storage device cannot fix the error. Typically, the storage device will attempt to read a sector multiple times before throwing a read uncorrectable error. Such an error can be caused by a variety of factors, such as the storage device aging, magnetic signals weakening, memory cells failing, etc.

At block 406, the controller can determine a remediation action in response to the error. For example, rules or settings may have been implemented by the storage device manufacturer or a user that determine the desired action in response to an uncorrectable read error. Among the possible choices are suppressing the error (block 408) or reporting the error (block 414)

If the determined action is to suppress the error, the process proceeds to block 408. At block 408, the controller suppresses the uncorrectable read error report to the host system. Rather, the controller handles the uncorrectable read error itself, without the involvement of the host system.

At block 410, the controller rebuilds the first stripe portion form other stripe portions and error-correction data stored on other storage devices in the storage array (e.g., a RAID array). For example, the controller can use XOR operations on the other stripe portions and the error-correction data to rebuild the first stripe portion.

At block 412, the controller writes the first stripe portion on the first storage device. As the data has been restored, the first stripe is fully intact in the storage array. In some embodiments, the first data may be written to a different storage device than the first storage device (e.g., another storage device in the storage array).

If the determined action is instead to report the error, then the process processed to bock 414. At block 414, the controller reports the uncorrectable read error to the host system. The host system can then decide on the response.

Assuming the host system 105 determines to attempt a repair, at block 406, the controller receives instructions from the host system to recover the data. The controller then proceeds to block 410 and performs the actions described above.

In some scenarios, the host system 105 may decide not to attempt the repair and the process 400 ends with no further actions. For example, the system 105 may determine that going to different mirrored data center or data center location that stored a copy of the data is faster. In one embodiment, the host system can choose to start a parallel query to the second location storing the copy of the data while also proceeding to block 410 and attempting to rebuild the data.

In some embodiments, the order of some of these steps may occur differently. For example, the controller may first attempt to rebuild the first stripe portion (block 410) and then suppress the URE (block 408) only if the rebuild is successful.

Fabric Interconnect System and Graphic Cards

Another possible use of the fabric interconnect system 100 is in off-loading certain types of computational tasks to graphical processing units (GPUs). Due to their design, graphic card GPUs are better suited for certain types of computation tasks than central processing units (CPUs). For example, GPUs are well suited for low precision tasks that are highly parallelizable. Such tasks often appear in machine learning, artificial intelligence, deep learning, neural networks, and other types of tasks.

However, GPUs are presently bottlenecked by throughputs and connection speeds to other components. Particularly when large data sets (terabytes, petabytes or more) are used, these bottlenecks limit the speed of computation tasks.

CCIX or other types of interconnects can be used in the fabric interconnect system to reduce bottlenecks. CCIX and certain other types of memory fabrics are much lower latency than rack interconnects or other multi-host interconnects, such as NVMeoF. For example, using CCIX allows multiple masters for the storage devices (unlike PCIe and NVMe drives). Further, the coherency of CCIX allows the tracking of objects to be handled by the CCIX fabric rather than managed by a master entity, such as the CPU. This reduces the work that needs to be done by the master (e.g., CPU), and it allows more robust latency sensitive tracking of the coherency by adhering to the rules of the fabric. This can reduce blocking of objects waiting on other work to complete. It can provide finer grained coherency on various regions depending on their memory handling settings. The GPU's DDR efficiency (and therefore throughput efficiency of the computing task) will improve as a result.

There are multiple ways for work to be assigned to the computing system. In one way, work can be distributed to each GPU card, which has its own queue (e.g., FIFO). However, it may be hard to synchronize the work if the GPUs are at different speeds and/or experiencing different delays such as data transfer delays. In another way, work can be maintained in a global worklist (e.g., a list, file, queue, database or the like) on the CCIX DRAM that is accessible to every component on CCIX interconnect. By storing the worklist on the interconnect, accesses and/or writes to the worklist don't need to involve the CPUs, thereby eliminating or at least reducing another bottleneck involving the CPU. In yet another way, the CPU can keep and maintain the worklist separately and manages coordination of work with the other components (e.g. GPUs). Depending on the embodiment, the enhanced interconnect system can use any one or combination of these work distribution methods.

In an example workflow, the CPU can load SSDs (or other storage devices) with data from a storage tier. The SSDs can be in a RAID array. The worklist is communicated to GPUs, to enable coordination on a task. In an embodiment, the worklist includes addresses of objects, so that the GPUs have the object location in the SSDs. The worklist can also include RAID failover addresses of objects, so that if an SSD fails, the GPUs can proceed with by accessing another copy of the object in the RAID array. In one embodiment, the CPU's software enforces any coherency needs. GPUs can read from SSD's second port, if directly connected (e.g., dual-ported NVMe). Failed drives can cause rerouting of reading objects, such as by having a GPU attempt to read objects through a high speed GPU interconnect such as NVLink and/or peer GPU card. In response to the drive failure, the CPU or GPU can master a rebuild of the RAID array.

Figure 5:
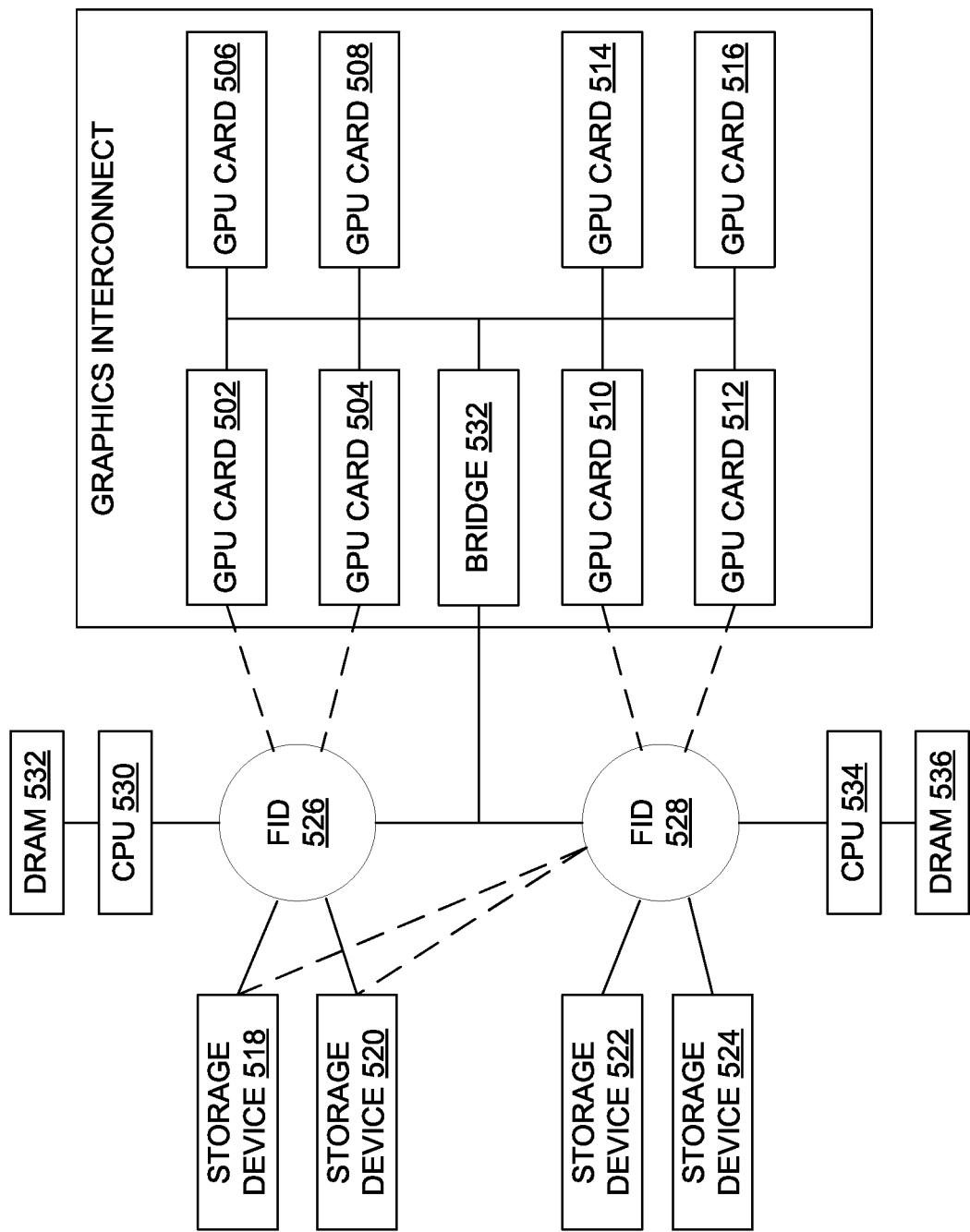
FIG. 5 a block diagram of the fabric interconnect system using a Cache Coherent Interconnect for Accelerators (CCIX) fabric, in accordance with some embodiments.

FIG. 5 is a block diagram of the fabric interconnect system 100 using a CCIX fabric, in accordance with some embodiments. The fabric interconnect system comprises one or more storage devices (e.g., SSDs, HDDs, SSHDs), one or more CPUs and CPU components such as RAM, and one or more GPU cards. The system may be a single computing device in a single enclosure or may be multiple devices in multiple enclosures (e.g., one or more server racks in a data center). For example, the storage tier may be comprised of one or more rack-mounted servers. Various components of the computing system may be connected by internal busses (e.g., PCIe and the like) or through a rack connection such as Ethernet, InfiniBand, or other high bandwidth connection for rack-to-rack or intra-rack interconnect in a data center.

In the figure, 8 GPUs (502, 506, 504, 508, 510, 512, 514, 516) and 4 storage devices (518, 520, 522, 524) are shown. The storage devices are grouped into pairs of mirrored drives (518 & 520; 522 & 524). In one embodiment, the CCIX fabric comprises two switches or fabric interconnect devices (FIDs) 526, 528, to allow greater number of components. The first switch 526 comprises interconnects to two storage devices 518, 520, a CPU 530 and associated DRAM 532, 2 GPU cards 502, 504 and a bridge 532 to an NVLink or other graphical link connector. The second switch 528 comprises similar interconnects. Additional GPU cards can be connected via the bridge to the a high speed GPU interconnect. Having multiple GPUs interconnected to each switch allows greater bandwidth.

In some embodiments, one or more of the storage devices may be dual-ported (or multi-ported), allowing connections to multiple components. For example, storage devices 518, 520 may be dual-ported, with a first connection to FID 526 and a second connection to FID 528 (shown as dashed lines).

The fabric interconnect devices 526, 528 form the CCIX fabric that provides data pathways that connect to various components. Data flows can then bypass other components, such as the CPU. For example, data can flow directly from the storage device 518 to the GPU card, 502 while bypassing the CPU 530. This removes the CPU as a bottleneck in the certain tasks.

The fabric interconnect devices 526, 528 can allow coordination between CPUs 530, 534 of work assignments. The CPUs collectively can act as a single CPU for the other components, with coordination between individual CPUs handled transparently by the CPUs. In one embodiment, CCIX coherency rules may be used to accelerate RAID set-up.

Furthermore, CCIX interconnects can allow for much larger caches as a larger total number of individual storage devices can be interconnected together. With larger caches, the computing system can reduce the accesses to slower storage arrays (e.g., on other racks or data centers), which may be made up of slower storage devices (e.g., HDD etc.) for long-term storage of data.

In one embodiment, the fabric interconnect device 526 manages cache coherency instead of the CPU 530. The fabric interconnect device can include memory (e.g., DRAM) for storing the worklist of the computing system. The fabric interconnect device can then manage the workload for the system by maintaining the worklist. By using the fabric interconnect device rather than the CPU, the requirements for the CPU can be lowered. For example, lower power CPUs or a lesser number of CPUs can be used in the computing system.

In one embodiment, GPUs can use a first-in, first-out (FIFO) queue, though other types of queues can be used. In an embodiment, the CPU maintains coherency and job tracking. For example, CPUs can master or coordinate the communications and/or operations. GPUs can be provided "data ownership" by the CPUs to maintain coherency when handling data objects during a task. GPUs can be provided LBA ranges for handling data objects. GPUs can then return the objects with the completion of its GPU tasks. In an embodiment, the GPU has exclusive write access to the data while it owns the data, then releases the exclusive write access when it returns control of the object back to the CPU.

Coherency can have many different variations including where it is implemented and enforced (e.g., L1 cache, L2 cache, L3 cache, local DRAM cache, at the fabric interconnect such as CCIX, etc.). The rules to be enforced may also change depending on the implementation. Variations of what rules are enforced can be large and include write ordering, write comparison checks prior to write execution, write through, write back, read ordering, region access locking to prevent any reads or writes from other entities, and region access locking to prevent writes from other entities. There can also be different coherency settings for different devices or address ranges within devices. It is possible that the coherency rules may change during system usage.

In an embodiment, the CPUs 530, 534 could master/oversee operations in the computing system. For example, the CPUs can transfer data from a storage tier into caching SSDs and set up the RAID protections appropriately for the SSDs.

The worklist of tasks for the GPUs could be distributed to each of the GPU cards. The worklist can be located on a CCIX connected DRAM device and/or held by the CPUs (e.g., on attached memory or cache). In one embodiment, the worklist describes object addresses, which can encompass address ranges over RAID storage. SSDs (or other types or storage devices) can be represented by address ranges within CCIX.

In an example workflow, the GPUs pull in new work from the worklist. For example, the GPUs may each have their own work queues that reflect portions of the worklist. The GPUs can avoid preemptively locking address ranges by only locking the address range when a GPU actually starts working on a particular range. For example, if the GPUs' work queue has several tasks, it doesn't necessarily lock the addresses associated with those tasks while they are on the queue.

The GPUs can also pull in the objects over CCIX fabric. All coherency options for object can be access enabled. Once a task is completed, GPU completions and checkpoints can be written to a shared write log or the worklist maintained in the storage devices or in the CCIX DRAM device. Alternatively or additionally, the completed jobs could be written to a completion FIFO for a CPU to pick up and close the task.

Figure 6:
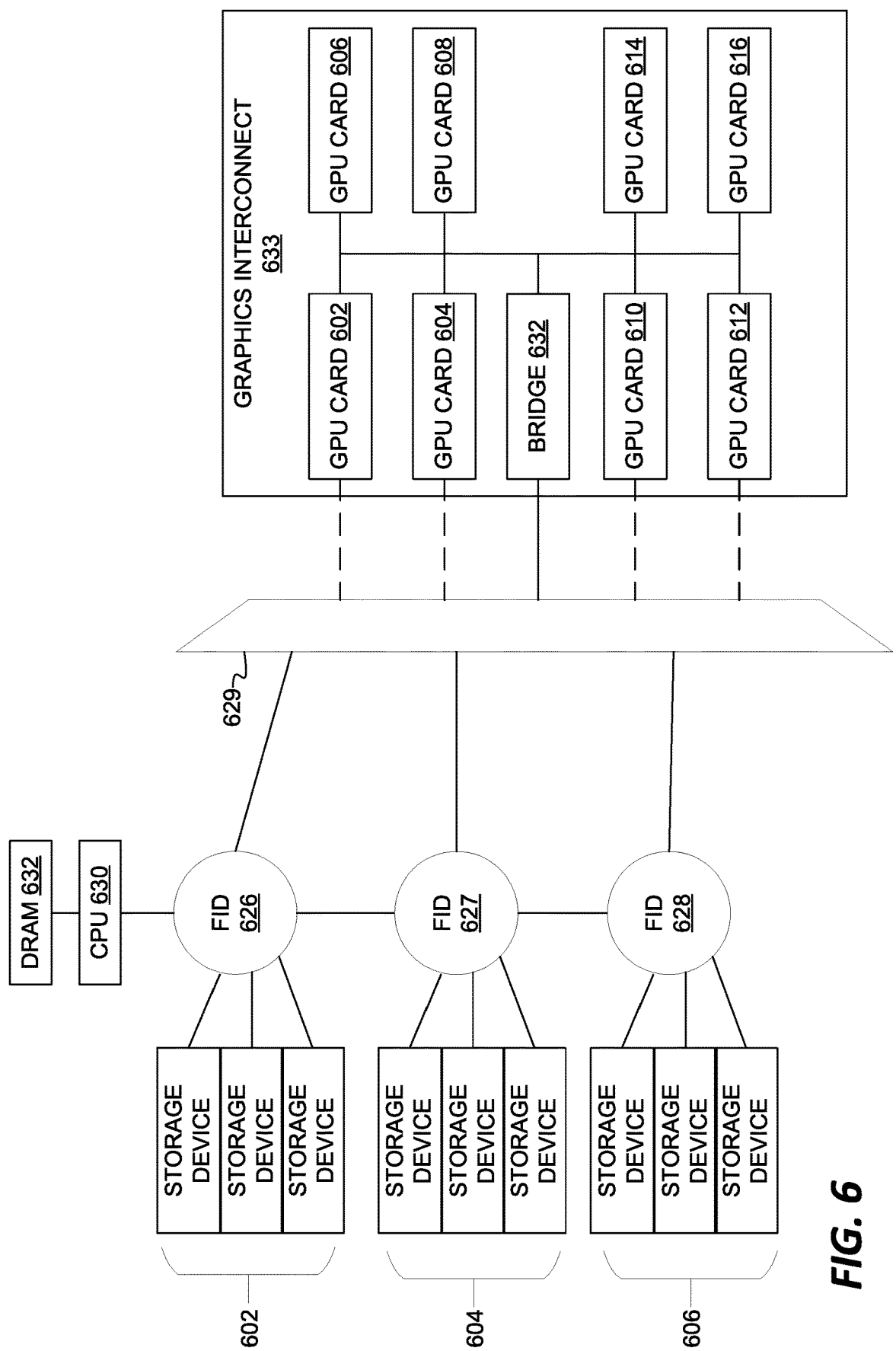
FIG. 6 is a block diagram of the fabric interconnect system using a multi-switch CCIX fabric with several storage devices in RAID arrays, in accordance with some embodiments.

FIG. 6 is a block diagram of the fabric interconnect system 100 using a multi-switch CCIX fabric with several storage devices in RAID arrays 602, 604, 606, in accordance with some embodiments. In the illustrated embodiment, there are a total of 9 storage devices in 3 RAID arrays 602, 604, 606 connected through 3 fabric interconnect devices 626, 627, 628. These switches can be connected to each other through a larger backbone switch 629 or interconnect device with possibly more lanes. The 9 storage devices are then equally accessible to all CPUs and GPUs through the fabric formed by the fabric interconnect devices. In some embodiments, the CPU 630 is in communication with a storage tier (e.g., slower storage devices like HDDs or tape drives) which stores persistent data and from which data can be brought to the storage devices.

The fabric interconnect devices 626, 627, 628 provide the CCIX fabric between the storage devices and the CPU 630 and its DRAM 632, the CCIX DRAM and the GPU cards (602, 604, 606, 608, 610, 612, 614, 616). The CCIX fabric may also utilize a bridge 632 to connect to a graphics card interconnect 633 such as NVLink.

As will be apparent, any number of storage devices can be used, with additional fabric interconnect devices utilized as needed to support the greater number of storage devices. Further, the number of CPUs and GPU cards can also be scaled as needed. In addition, the various (direct or indirect) connectivity options can be used to connect the CPUs and GPUs to the CCIX fabric and/or high speed GPU interconnect fabric. For example, some GPU cards may not be directly connected to the CCIX. Additionally, the CPU may be connected to the CCIX backbone component via direct connect or through a bridge (e.g., PCIe-CCIX bridge).

While certain embodiments are described herein in the context of fabric interconnect systems, it should be understood that different types of storage devices and RAM technology can be used in the above embodiments. For example, the RAM could comprise any of Static RAM (SRAM), Dynamic RAM (DRAM), Synchronous Dynamic RAM (SDRAM), Single Data Rate Synchronous Dynamic RAM (SDR SDRAM), Double Data Rate Synchronous Dynamic RAM (e.g., DDR SDRAM, DDR2, DDR3, DDR4), Graphics Double Data Rate Synchronous Dynamic RAM (e.g., GDDR SDRAM, GDDR2, GDDR3, GDDR4, GDDR5), and/or flash memory. Non-volatile rando-access memory could also be used, such as non-volatile dual in-line memory module (NVDIMM), NVDIMM-N, NVDIMM-P, and/or NVDIMM-F.

In addition, the storage devices can utilize hard disk drive (HDD) and/or different types of non-volatile memory such as NAND and its variations like SLC (Single Level Cell), eMLC (Enterprise Multi Level Cell), MLC (Multi Level Cell), TLC (Triple Level Cell), and QLC (Quadruple Level Cell). New types of emerging non-volatile memory could also be used such as Program in Place or Storage Class Memory (SCM) such as ReRam, PCM, and MRAM.

Furthermore, any number of CPUs, GPUs, SSDs, HDDs, SSHDs can be used in the above computing systems. For example, GPUs can be increased if additional computing capabilities are needed. SSDs can also be increased and/or larger capacities used if additional storage and/or throughput is needed.

Additionally, while the above description has focused on an NVMeoF fabric and CCIX fabric, other types of GPU/CPU interconnect can be used, such as CXL, NVLink, PCIe, OpenCAPI, GenZ, proprietary interconnects, RapidIO, and/or the like. In addition, while the above has focused on creating a mesh using an interconnect fabric and GPUs, the above architecture can be used to create a mesh of CPUs.

In some embodiments, using dual-ported or multi-ported NVMe drives provides GPUs with direct access to storage. Multi-ported NVMe drives allow a direct connection to the CPU and to the GPU (as well as to other components in embodiments with more than 2 ports). GPUs can pull in data directly from the storage devices with no delay through CPUs. This increases effectiveness of GDDR by emptying and filling it with reduced latency. That is, the throughput increases as less time is spent waiting to fill the GDDR with new data, allowing the GPU to utilize the data sooner and then replace the now old data with new data. Further, the lower latency of data request to data filled means less of the GDDR is in a transient state waiting to be filled. This allows more GDDR space for other uses such as increased number of active GPU cores, increased GPU caching size, or larger local GPU datasets.

Additional Embodiments

Those skilled in the art will appreciate that in some embodiments, other types of fabric interconnect systems can be implemented while remaining within the scope of the present disclosure. In addition, the actual steps taken in the processes discussed herein may differ from those described or shown in the figures. Depending on the embodiment, certain of the steps described above may be removed, others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

What is claimed is:

1. A computing system comprising:
a host processor configured to initiate a first write operation associated with a first data and a second data;
a first storage device comprising a first main storage memory and a first local memory buffer separate from the first main storage memory;
a second storage device comprising a second main storage memory and a second local memory buffer separate from the second main storage memory;
a third storage device comprising a third main storage memory and a third local memory buffer separate from the third main storage memory;
a fabric interconnect device configured to connect a plurality of storage devices, including the first storage device, the second storage device and the third storage device, over a fabric network to the host processor; and
a controller located at the fabric interconnect device or the first storage device, the controller configured to receive the first write operation from the host processor and perform the first write operation by at least:
writing the first data associated with the first write operation to the first local memory buffer in the first storage device;
writing error-correction data in the third local memory buffer in the third storage device based on the first data written to the first local memory buffer;
writing the second data associated with the first write operation to the second local memory buffer in the second storage device;
calculating updated error-correction data, using a data-protection operation performed directly on the second data in the second local memory buffer and on the error-correction data in the third local memory buffer; and
writing the updated error-correction data in the third local memory buffer in the third storage device.

2. The computing system of claim 1, wherein the first, second and third local memory buffers are at least one of a Controller Memory Buffer (CMB) and a Persistent Memory Region (PMR).

3. The computing system of claim 1, wherein, in response to the writing of the first data to the first local memory buffer, the first storage device is configured to write the first data to a permanent storage of the first storage device.

4. The computing system of claim 3, wherein, in response to the writing of the second data to the second local memory buffer, the second storage device is configured to write the second data to the second main storage memory.

5. The computing system of claim 1, wherein the controller is further configured to:
flush the error-correction data in the third local memory buffer into the third main storage memory in the third storage device.

6. The computing system of claim 1, further comprising a fourth storage device, wherein data written to the fourth storage device causes the error-correction data in the third local memory buffer to be updated.

7. The computing system of claim 1, wherein:
the first write operation comprises a Redundant Array of Independent Disk (RAID) write operation;
the error-correction data comprises parity data; and
the data-protection operation comprises an exclusive-or (XOR) operation.

8. The computing system of claim 1, wherein:
the error-correction data comprises at least one of mirrored data, system-level erasure encoding data, and error detection codes.

9. The computing system of claim 1, wherein:
the first storage device comprises the controller; and
a second controller in the second storage device is configured to perform a subsequent write operation, instead of the controller in the first storage device.

10. The computing system of claim 1, wherein the controller is further configured to:
perform a read operation on the first storage device and the second storage device;
receive an uncorrectable read error message from at least one of the first storage device and the second storage device; and
initiate, without additional instructions from the host processor, an in-place rebuild of data associated with the read operation.

11. The computing system of claim 10, wherein the controller is further configured to:
in response to successfully completing the in-place rebuild, suppress the uncorrectable read error message such that the host processor does not receive the uncorrectable read error message.

12. A method for calculating error-correction data on local buffers during a write operation associated with a first data and a second data, the method comprising:
receiving, on a controller separate from a host processor, a first write operation from the host processor;
identifying a first storage device, a second storage device, and a third storage device associated with the write operation;
writing the first data associated with the first write operation to a first local memory buffer in the first storage device;
writing error-correction data in a third local memory buffer in the third storage device based on the first data written to the first local memory buffer;
writing the second data associated with the first write operation to a second local memory buffer in the second storage device;
calculating, by the controller, updated error-correction data, using a data-protection operation performed directly on the second data in the second local memory buffer and on the error-correction data in the third local memory buffer; and
writing the updated error-correction data in the third local memory buffer in the third storage device;

wherein the first storage device, the second storage device, and the third storage device are interconnected by a fabric interconnect device; and
wherein the controller is located on the fabric interconnect device or the first storage device.

13. The method of claim 12, wherein, in response to the writing of the first data to the first local memory buffer, the first storage device is configured to write the first data to a permanent storage of the first storage device.

14. The method of claim 13, wherein, in response to the writing of the second data to the second local memory buffer, the second storage device is configured to write the second data to a permanent storage of the second storage device.

15. The method of claim 12, further comprising:
flushing the updated error-correction data in the third local memory buffer into a permanent storage of the third storage device.

16. The method of claim 12, wherein the fabric interconnect device comprises the controller.

17. The method of claim 12, wherein the first storage device comprises the controller.

18. The method of claim 12, further comprising:
performing a read operation on the first storage device and the second storage device;
receiving an uncorrectable read error message from at least one of the first storage device and the second storage device; and
initiating, without additional instructions from the host processor, an in-place rebuild of data associated with the read operation.

19. The method of claim 18, further comprising:
suppressing the uncorrectable read error message such that the host processor does not receive the uncorrectable read error message.

20. A computing system comprising:
a host system configured to initiate a first write operation associated with a first data and a second data;
a first storage device comprising a first main storage memory and a first means for local buffering separate from the first main storage memory;
a second storage device comprising a second main storage memory and a second means for local buffering separate from the second main storage memory;
a third storage device comprising a third main storage memory and a third means for local buffering separate from the third main storage memory;
a means for interconnecting configured to connect a plurality of storage devices including the first storage device, the second storage device and the third storage device, over a fabric network to the host system; and
a means for processing located at the means for interconnecting or the first storage device, the means for processing configured to receive the first write operation from the host system and perform the first write operation by at least:
writing the first data associated with the first write operation to the first means for local buffering in the first storage device;
writing error-correction data in the third means for local buffering in the third storage device based on the first data written to the first means for local buffering;
writing the second data associated with the first write operation to the second means for local buffering in the second storage device;

calculating updated error-correction data, using a data-protection operation performed directly on the second data in the second means for local buffering and on the error-correction data in the third means for local buffering; and
writing the updated error-correction data in the third means for local buffering in the third storage device.

* * * * *